3,325,400
PROCESS FOR EXTRACTING WATER FROM BRINE AND GENERATING STEAM WITH A HOT HYDROCARBON LIQUID
Howard V. Hess, Glenham, Frank E. Guptill, Jr., Fishkill, and Norman D. Carter, Poughkeepsie, N.Y., assignors to Texaco Inc., New York, N.Y., a corporation of Delaware
Filed Oct. 10, 1963, Ser. No. 315,231
10 Claims. (Cl. 210—21)

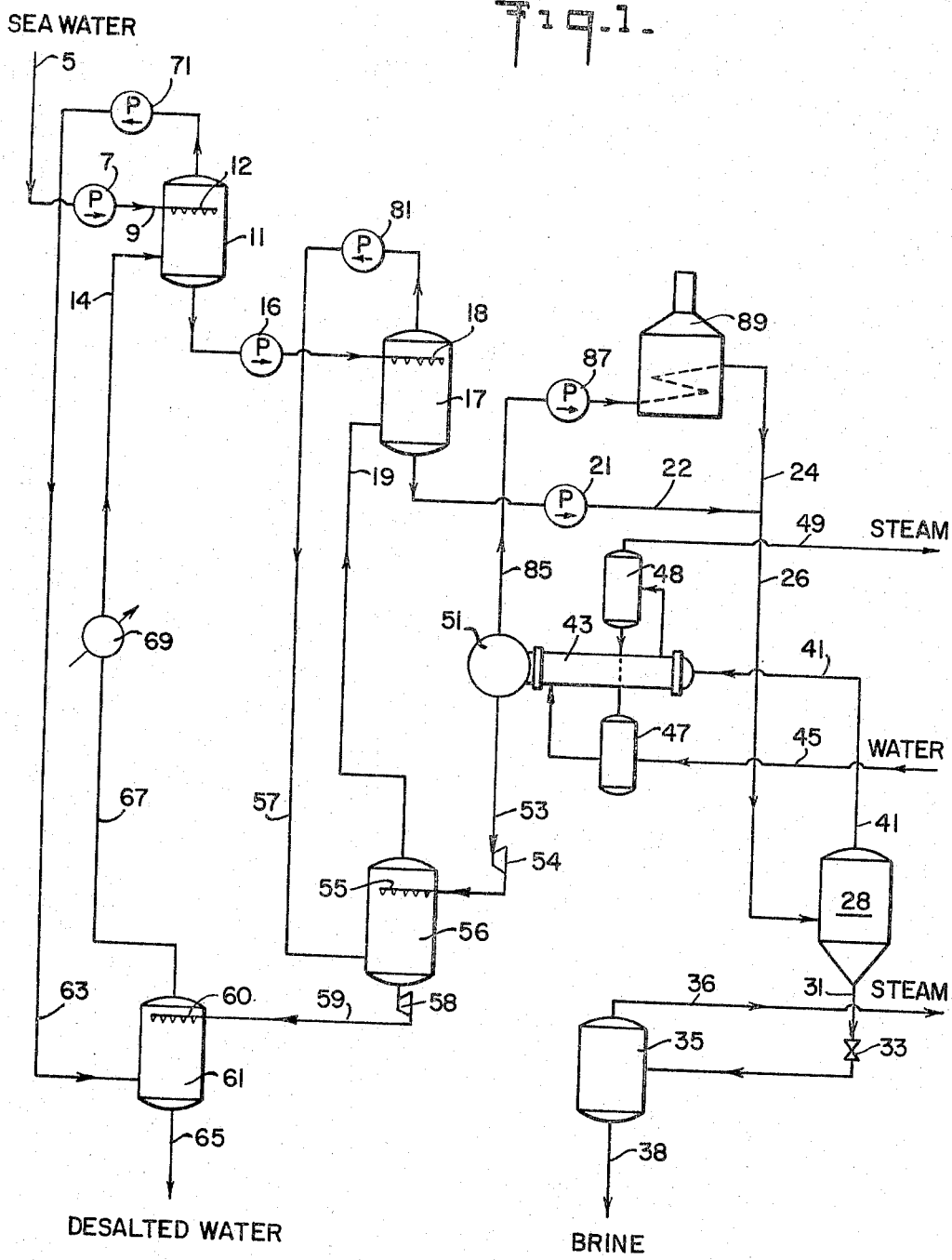

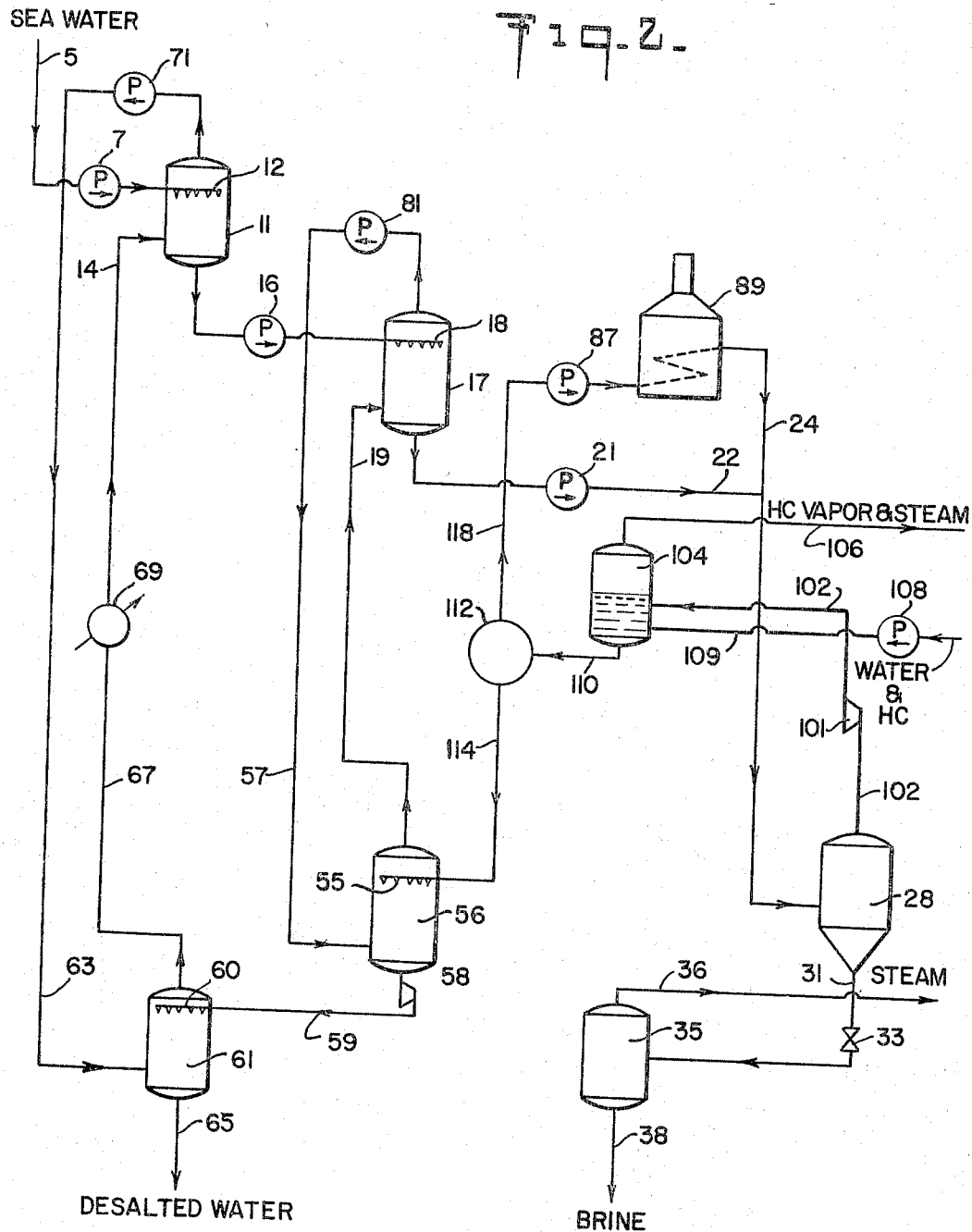

The present invention relates to a novel process and apparatus for generating steam and simultaneously extracting fresh water from brine. The process is applicable to the recovery of salt-free water from brines and to the concentration of various brines for the recovery of valuable solution salts contained therein.

In one of its more specific aspects, the present invention is concerned with a process for generating steam and recovering fresh water from brine wherein hot hydrocarbon liquid under pressure is brought into contact with heated brine thereby extracting water substantially free from inorganic salts from the brine and the resulting extract is separated from the residual brine and resolved into its constituents. At the same time, high pressure steam is generated by heat available from the hot complex. The term "brine" is used in a broad sense to denote the entire range of concentrations of water soluble inorganic salts in water, for example, natural saline water containing sodium chloride, including brackish water, sea water, and saturated or nearly saturated brines, such as the brine in Great Salt Lake or brines obtained from wells. In addition to sodium chloride-containing solutions, other brines to which the process may be applied include aqueous solutions of dissolved mineral salts, for example, halides, carbonates and sulfates of sodium, potassium, lithium, calcium, magnesium, zinc and copper.

The present invention involves a novel desalination process which is dependent upon contact of hot brine with a hot hydrocarbon liquid characterized by the property of extracting a greater amount of water at a high temperature (e.g., at a temperature of 500° F. or above) than at a lower temperature, whereby water is extracted from the brine by the hydrocarbon and forms a complex which is immiscible with the residual brine and may be separated therefrom by gravity. After separation from the residual brine, the complex is decomposed by reducing the temperature sufficiently below the extraction temperature to cause the hydrocarbon and water to separate from one another as two liquid phases; the water phase or the residual brine may be product and the hydrocarbon phase is recycled to the extraction zone. The basic process is disclosed in copending U.S. patent application of Howard V. Hess, Ser. No. 310,515, filed Sept. 16, 1963, a continuation-in-part of Ser. No. 144,240, filed Oct. 10, 1961, and now abandoned. The present application is directed to improvements in the basic process.

The term "complex" is used herein to designate the solution of water in hydrocarbon liquid, especially the extract leaving the extraction zone, since it is not entirely certain at this time whether it is a true solution of water in hydrocarbon liquid or a hydrocarbon solution containing a hydrate of the water and hydrocarbon.

For greatest efficiency the present process should be operated at a temperature above 500° F. for the extraction step, after which the temperature is reduced below the extraction temperature for the phase separation step, advantageously by at least 50° below the extraction temperature to assure breaking out the major part of the water. When using aliphatic hydrocarbons, somewhat greater extraction efficiency is obtained if the temperature is kept above 550° F.

By way of illustration, n-decane has the property of extracting 22.2% its weight of water at 575° F., 9% at 550° F., and only 3.3% at 500° F. Consequently, with the extraction process operating at 575° F., and the decomposition step at 500° F., there is a recovery of water in the amount of about 19 percent of the n-decane.

The operating pressure of the extraction step must be sufficiently high to maintain both the brine and the hydrocarbon in a liquid condition at the operating temperature, normally being greater than 1000 p.s.i.g. and sometimes being as high as 3000 p.s.i.g. Usually the phase break and separation part of the system is at the same operating pressure.

The upper temperature limit should be below the temperature at which vaporization can occur in the extractor to ensure that the fluids in the system are in liquid phase.

Normally liquid hydrocarbons are generally suitable for use in the process of this invention. Hydrocarbons and mixtures of hydrocarbons containing from 6 to 30 carbon atoms per molecule may be used in the process. Hydrocarbons of 8 to 20 carbon atoms per molecule, and particularly those containing 9 to 12 carbon atoms per molecule, are preferred. Various petroleum fractions including kerosene, naphtha, odorless spirits, and gasoline, may be used in the process. Examples of individual hydrocarbon types which can be used in the process of the present invention, either alone or in admixture with one another, are the aliphatic hydrocarbons, including hexane, 2,3-dimethylbutane, heptanes, octanes, isoctane, nonanes, decanes, propylene tetramer, hexadecane, 2-methyl-1-pentene etc.; alicyclic hydrocarbons, e.g., methylcyclopentane, cyclohexane, methylcyclohexane, dimethylcyclohexane, ethylcyclohexane, tetralin, isopropylcyclohexane, cyclohexene, pinene, etc.; and aromatic hydrocarbons e.g., benzene, cumene, xylenes, methylnaphthalenes, etc. The preferred hydrocarbons are those which are stable under the temperature and pressure conditions employed in the process, for example, 550° F., to 650° F. and 2000 to 3000 p.s.i.g., and which have low toxicity and low solubility in water at normal temperatures and pressure. In general, the saturated hydrocarbons are the more satisfactory hydrocarbons for use in the process.

Preferred petroleum fractions useful in the present process include normal paraffin hydrocarbons containing 10 to 12 carbon atoms per molecule; isoparaffin hydrocarbons of 12 carbon atoms per molecule, e.g., the bottoms fraction obtained from alkylation of butylenes with isobutane; a hydrocarbon fraction consisting essentially of aromatic hydrocarbons of 9 to 10 carbon atoms per molecule obtained by extraction of petroleum naphtha with diethylene glycol; propylene tetramer; a gasoline fraction containing hydrocarbons of 10 to 12 carbon atoms per molecule; and naphthenes containing 9 to 10 carbon atoms per molecule.

Some petroleum fractions may include impurities, e.g., sulfur compounds, but such impurities do not normally exist in sufficient quantity to adversely affect the use of the petroleum fractions in the process of the invention. These impurities tend to be removed from the hydrocarbons after a short period of use.

In the drawings:
FIG. 1 is a schematic flow diagram showing an arrangement of apparatus for carrying out the process of this invention.
FIG. 2 is a schematic flow diagram showing an alternate arrangement of apparatus for carrying out the process of this invention.

With reference to FIG. 1, a plant for recovering fresh water from sea water, or brine, and for simultaneously generating steam is illustrated. In this specific example, Udex extract is employed as the hydrocarbon liquid. Udex extract is an aromatic hydrocarbon fraction, comprising mainly xylenes, obtained by treating a petroleum naphtha with diethylene glycol for removal of aromatic hydrocarbons therefrom. In this example, Caribbean (Trinidad) sea water is processed to produce one million gallons of fresh water per day. The sea water is supplied at the rate of 400,200 lbs. per hour through line 5 at ambient temperature, for example 105° F., to pump 7, which raises the pressure of the brine 150 p.s.i.g., and passed through line 9 into the upper part of a brine heater 11. Brine heater 11 comprises a vertical, cylindrical vessel provided with a brine distributor 12 in the upper portion of the vessel.

In operation, brine heater 11 is maintained full of liquid, with the hydrocarbon liquid forming the continuous phase and brine, the discontinuous phase. The brine from line 9 flows downwardly in heater 11 in intimate, direct contact with upwardly flowing hot hydrocarbon liquid, i.e., Udex extract, supplied at 336° F. to the lower portion of heater 11 by line 14 at the rate of 700,300 lbs. per hour. The hydrocarbon entering brine heater 11 through line 14 also contains 7,400 lbs. per hour of fresh water, as explained hereinafter. In heater 11, the brine is heated by direct contact with the hydrocarbon to about 300° F. while the hydrocarbon liquid is cooled to about 125° F. Direct heating, as described herein, almost entirely eliminates the problems of scale deposition and metal corrosion encountered with indirect heat exchangers.

Preheated brine from the lower part of heater 11 is withdrawn at the rate of 406,800 lbs. per hour (the weight increase resulting from dilution with 6,600 lbs. per hour of fresh water), together with 300 lbs. per hour of hydrocarbon. The pressure of the brine is increased to 750 p.s.i.g. by pump 16 and the brine then introduced through distributor 18 into the upper portion of a second vertical cylindrical brine heater 17 where it is further heated by direct countercurrent contact with hot hydrocarbon liquid. In this example, the hot hydrocarbon liquid (Udex extract) is supplied to the lower part of brine heater 17 through line 19 at 462° F. at the rate of 653,400 lbs. per hour, together with 32,500 lbs. per hour of fresh water contained in the hydrocarbon liquid as described hereinafter. The hydrocarbon liquid is cooled in brine heater 17 to about 320° F. while heating the brine to about 440° F. Hot brine from brine heater 17 is withdrawn through pump 21 at the rate of 432,500 lbs. per hour (the increase in amount resulting from dilution with 32,300 lbs. per hour of fresh water introduced into the brine with hydrocarbon from line 19), together with 3,300 lbs. per hour of hydrocarbon, the source of which will be explained hereinafter.

The preheated brine from brine heater 17 is raised to a pressure of 2,650 p.s.i.g. by pump 21 and passed through line 22 where it is mixed with 402,200 lbs. per hour of hot hydrocarbon liquid (Udex extract) from line 24 at 985° F. containing 26,100 lbs. per hour of water. The resulting hot mixture of brine and hydrocarbon at 638° F. is passed through line 26 to separator 28 operated at 2,650 p.s.i.g. Upon mixing the preheated brine with the hot hydrocarbon liquid, a complex or extract of water in hydrocarbon is formed which is substantially free from salt. In separator 28, the hot complex separates from resulting concentrated brine to form two separate liquid phases. The resulting concentrated brine, amounting to 53,200 lbs. per hour, is drawn from the bottom of separator 28 through line 31 to pressure reduction valve 33 where its pressure is reduced to 10 p.s.i.g. and passed to a flash drum 35. In the flash drum 35, steam at 260° F. is flashed from the concentrated brine and passed through line 36 at the rate of 19,700 lbs. per hour. The residual brine, amounting to 33,500 lbs. per hour is discharged through line 38 at 260° F.

Complex formed by the hot hydrocarbon liquid and brine in line 26 and separated from the residual brine in separator 28, at 638° F., is withdrawn through line 41 at the rate of 810,900 lbs. per hour. The complex comprises 405,400 lbs. per hour of water and 405,500 lbs. per hour of hydrocarbon liquid. The hot hydrocarbon complex is passed through waste heat boiler 43 where it is cooled by indirect heat exchange with water to generate 168,500 lbs. per hour of steam at 450 p.s.i.g. and 460° F. Feed water is supplied to the boiler 43 through line 45 at 460° F. and 450 p.s.i.g. The waste heat boiler 43 is provided with the usual mud drum 47 and steam drum 48. Steam generated in boiler 43 is discharged through line 49.

The hot hydrocarbon complex is cooled in waste heat boiler 43 from 638° F. to 480° F., decomposing the complex to form two separate, immiscible liquid phases. One is a fresh water phase substantially completely free from dissolved salts and containing a minor amount of hydrocarbon, and the other is a hydrocarbon liquid phase containing some water. The cooled liquid effluent from the waste heat boiler enters a separator 51 where separation takes place between the water phase and the hydrocarbon phase. The water phase is withdrawn from the lower part of separator 51 at the rate of 379,300 lbs. per hour at 480° F., together with 3,300 lbs. per hour of hydrocarbon liquid, through line 53 to a turbine 54, where its pressure is reduced to 750 p.s.i.g., and introduced through distributor 55 into the upper part of water cooler 56. Water cooler 56 is constructed and arranged like brine heater 11, described above. In water cooler 56, desalted water is passed downward countercurrent to relatively cool hydrocarbon liquid (Udex extract) supplied to the lower part of cooler 56 through line 57 at 320° F. at the rate of 650,400 lbs. per hour, together with 6,800 lbs. per hour of water. Direct heat exchange between the fresh water and the hydrocarbon liquid in cooler 55 effects heating of the hydrocarbon liquid to 463° F. while cooling the water to 340° F.

Cooled water is withdrawn from the lower part of water cooler 56 and passed through line 59 at 340° F. at the rate of 353,600 lbs. per hour, together with 300 lbs. per hour of hydrocarbon liquid, and passed through turbine 58, where its pressure is reduced to 150 p.s.i.g. After pressure reduction, the water is passed through line 59 and distributor 60 to a second water cooler 61 where it is contacted with 700,000 lbs. per hour of hydrocarbon liquid (Udex extract) containing 800 lbs. per hour of water at 135° F. In water cooler 61, the fresh water is cooled to 145° F. and the hydrocarbon liquid is heated to 320° F. The cooled fresh water at 145° F. is withdrawn through line 65 at the rate of 347,000 lbs. per hour.

Heated hydrocarbon liquid at 320° F. is drawn from water cooler 61 through line 67 at the rate of 700,300 lbs. per hour, together with 7,400 lbs. per hour of water, and passed to a heater 69 where the temperature of the hydrocarbon liquid is raised to 336° F. The heated hydrocarbon liquid is then passed through line 14 to the lower part of brine heater 11 to preheat the incoming sea water, as described above. Pump 71 circulates hydrocarbon in a continuous, substantially closed circuit from brine heater 11 to fresh water cooler 61 and back to heater 11, effecting heat transfer between recovered, desalted water and incoming sea water.

The 300 lbs. per hour of hydrocarbon liquid which enters cooler 61 with the water returns to the system via line 67 and brine heater 11. Pump 71 recirculates 700,000 lbs. per hour of hydrocarbon liquid, together with 800 lbs. per hour of water, through line 63 to water cooler 61, while the hydrocarbon liquid from water cooler 61, amounting to 700,300 lbs. per hour, returned to heater 11 via line 67, heater 69 and line 14 carries with it about 7,400 lbs. per hour of fresh water. Some 6,600 lbs. per hour of water from this source is picked up by the sea water in brine heater 11 and recycled to the system.

Hydrocarbon liquid from water cooler 56 is withdrawn through line 19 at 462° F. at the rate of 653,400 lbs. per hour, together with 32,500 lbs. per hour of water, and passed through line 19 to brine heater 17 as described above. Pump 81 circulates hydrocarbon liquid from brine heater 17 at 320° F. at the rate of 650,400 lbs. per hour, together with 6,800 lbs. per hour of water through water cooler 55 and line 75 in a substantially closed circuit effecting heat transfer between desalted water product of the process and incoming sea water.

Most of the 3,300 lbs. per hour of hydrocarbon entering water cooler 56 with the water through line 53 separates from the water in the water cooler 56, and about 3,000 lbs. per hour is returned to the high pressure system via line 19 and brine heater 17. Some of the desalted water, about 32,500 lbs. per hour is carried from water cooler 56 with the 653,400 lbs. per hour of hydrocarbon liquid through line 19 to brine heater 17 whereas only 6,800 lbs. per hour of water is carried in the 650,400 lbs. per hour of hydrocarbon returned to cooler 56 by pump 81 via line 57. This results in recycling 25,700 lbs. per hour of water to the system. At the same time, hydrocarbon liquid carried with the desalted water into water coolers 56 and 61 is returned to the brine heaters 17 and 11 respectively, with the circulating hydrocarbon liquid and recycled in the process.

Hydrocarbon liquid separated from the complex in separator 51 at 480° F. is withdrawn through line 85 by pump 87 at the rate of 402,200 lbs. per hour, together with 26,100 lbs. per hour of water, and passed through heater 89 where it is heated to 985° F. The heated hydrocarbon is then discharged through line 24 into admixture with preheated sea water from line 22 to form the complex as described above.

With reference to FIG. 2, an alternate embodiment of the high pressure steam generation system is illustrated. In FIG. 2, the heaters, coolers, separators and other auxiliary equipment designated by the same reference numerals as in FIG. 1 correspond to the apparatus described in connection with FIG. 1. For the purpose of this example, the operating conditions in the various process steps common to FIGS. 1 and 2, are identical, except as noted below, in order to permit comparison between the two methods.

In the embodiment illustrated in FIG. 2, hot complex from separator 28 at 638° F. passes through line 41 at the rate of 810,900 lbs. per hour. The complex comprising 50% water and 50% hydrocarbon liquid (Udex extract) by weight, is passed through a turbine 101 where the pressure is reduced from 2,650 p.s.i.g. to 672 p.s.i.g. From turbine 101, the complex is discharged through line 102 to separator 104 where part of the complex is vaporized by flash vaporization and the resulting vapor separated from unvaporized liquid. Flash vaporization cools the complex to 480° F. Vapor is discharged from separator 104 through line 106 at the rate of 351,000 lbs. per hour, comprising about 206,400 lbs. per hour of hydrocarbon vapor and 144,600 lbs. per hour of steam. The vapor at 480° F. and 672 p.s.i.g. is useful for heating or for power generation.

When this vapor is used for heating and condensate liquid is returned to the system by pump 108 through line 109 at 480° F., the heat available amounts to 128.6 million B.t.u.'s per hour. By way of comparison, in the system of FIG. 1, where 168,500 lbs. per hour of steam is available at 460° F. and 450 p.s.i.g. and condensate is returned at 460° F., the same amount of heat is available.

For the generation of power, not illustrated in the figures, with condensate returned at 100° F., the amount of high pressure steam available from boiler 43 in the example of FIG. 1 is reduced to 113,700 lbs. per hour. At 90 percent efficiency, about 13,700 kilowatts of electricity can be generated from the high pressure steam. In the example of FIG. 2, the amount of mixed steam and hydrocarbon vapor from separator 104 is reduced to 196,000 lbs. per hour, comprising 115,200 lbs. per hour of hydrocarbon vapor and 80,800 lbs. per hour of steam. This vapor is also capable of producing 13,700 kilowatts per hour of electrical energy at 90 percent efficiency. The reduction in quantities of steam and vapor available results from the additional heat load on waste heat boiler 43 of FIG. 1 and on separator 104 of FIG. 2 by returning the condensate at 100° F. rather than at 460° F. and 480° F., respectively.

Cooling of the complex by flash vaporization in separator 104 of FIG. 2 results in the formation of two separate liquid phases, i.e., a water phase containing a minor amount of hydrocarbon and a hydrocarbon phase containing water. The unvaporized liquid from separator 104 is passed through line 110 to separator 112 where the hydrocarbon liquid phase is separated from the water phate at 480° F. and 672 p.s.i.g. The water phase is discharged from separator 112 and passed through line 114 to separator 56 operated at about 670 p.s.i.g. Pump 116 withdraws the hydrocarbon phase from separator 112 at 480° F. and 672 p.s.i.g. through line 118 and raises its pressure to 2,650 p.s.i.g. before returning it to heater 89.

It will be noted that water cooler 56 and brine heater 17 in the example accompanying the description of FIG. 2 operates at a pressure of about 670 p.s.i.g. and with a water inlet temperature of 480° F., as compared with 750 p.s.i.g. and 460° F. as in the example accompanying the description of FIG. 1. These do not significantly affect the operation of the system as described in detail in connection with the description of FIG. 1.

The low pressure steam liberated from the concentrated brine in separator 35 may be used for deaerating and preheating the sea water by well known means, not illustrated in the drawings, prior to introduction of the fresh sea water to brine heater 11.

While the invention has been described above with its primary object the recovery of salt-free water from sea water or brine, it is evident that the highly concentrated brine leaving the bottom of the separator may have commercial value. Brines contain sodium chloride and often contain such other commercially valuable salts, such as magnesium, bromine and iodine salts which may be extracted from the concentrated brine product of the process.

We claim:

1. A process for extracting water from brine which comprises intimately contacting said brine with hydrocarbon liquid consisting of hydrocarbons containing not less than 6 and not more than 30 carbon atoms per molecule in liquid phase in a contacting zone at a temperature above 500° F. whereby a substantial quantity of water free from salt is extracted in said hydrocarbon liquid, separating resulting extract from residual concentrated brine, cooling said extract by an amount sufficient to liberate water from said extract and form separate water and hydrocarbon liquid phases by reducing the pressure on said extract from the elevated pressure of said contacting zone to a lower elevated pressure effective to cool said extract by flash vaporization of water at said reduced pressure with the generation of steam as a useful by-product of the process, and separating water substantially free from salt from said hydrocarbon liquid phase.

2. A process according to claim 1 wherein said elevated temperature in said contacting zone is within the range of 550 to 650° F. and steam is generated at a temperature below about 500° F.

3. A process according to claim 1 wherein said brine undergoing extraction is preheated to a temperature not above 500° F. by direct countercurrent contact with hot hydrocarbon liquid and said preheated brine is thereafter intimately mixed with hydrocarbon liquid at a temperature effective to form a mixture having a temperature in the range of 550° F. to 650° F. thereby forming said extract.

4. A process according to claim 1 wherein said separated water is further cooled in a heat exchange zone by direct countercurrent contact with relatively cool hydrocarbon liquid effecting simultaneous heating of said hydrocarbon liquid.

5. A process according to claim 4 wherein said heated hydrocarbon liquid is passed in direct countercurrent contact with relatively cool brine in a heat exchange zone effecting preheating of said brine and simultaneous cooling of said hydrocarbon liquid.

6. A process according to claim 5 wherein said direct heat exchange steps are carried out at an elevated pressure lower than the pressure in said contacting zone and effective to maintain said water and brine and said hydrocarbon liquid in liquid phase in said heat exchange zones.

7. A process according to claim 1 wherein concentrated brine is subjected to pressure reduction from said elevated pressure of said contacting zone to near-atmospheric pressure effecting cooling of said brine by a flash vaporization of low pressure steam therefrom.

8. A process according to claim 3 wherein said hydrocarbon liquid consists essentially of hydrocarbons containing not less than 9 and not more than 12 carbon atoms per molecule.

9. A process according to claim 3 wherein said hydrocarbon liquid is the continuous phase in said direct heat exchange steps.

10. A process for extracting water from brine and simultaneously producing high pressure steam which comprises passing relatively cool brine in direct countercurrent contact with relatively hot hydrocarbon liquid at a pressure in the range of 100 to 200 p.s.i.g. in a first heat exchange zone wherein said relatively cool brine is preheated and said hot hydrocarbon liquid is simultaneously cooled; passing preheated brine from said first heat exchange zone into direct countercurrent contact with a second stream of relatively hot hydrocarbon liquid; in a second heat exchange zone at a pressure in the range of 500 to 1000 p.s.i.g., passing resulting preheated brine at a temperature in the range of 400 to 450° F. and at a pressure in the range of 1500 to 3000 p.s.i.g. into admixture with hydrocarbon liquid forming a mixture at a temperature in the range of 550 to 650° F. forming an extract phase comprising hot hydrocarbon liquid and water substantially free from salt extracted from said brine; separating extract from resulting concentrated brine; cooling said separated extract by reducing pressure thereon to a lower elevated pressure effecting vaporization of water at said reduced pressure forming high pressure steam and liberating water from said extract; separating said liberated water from hydrocarbon liquid; passing said separated water to a third heat exchange zone at a pressure substantially equal to the pressure of said second heat exchange zone into direct counter-current heat exchange with hydrocarbon from said second heat exchange zone and returning heated hydrocarbon from said third heat exchange zone to said second heat exchange zone; passing partly cooled water from said third heat exchange zone to a fourth heat exchange zone into direct countercurrent contact with relatively cool hydrocarbon liquid from said first heat exchange zone at substantially the same pressure at said first heat exchange zone and passing heated hydrocarbon from said fourth heat exchange zone to said first heat exchange zone; and recovering cool water from said fourth heat exchange zone as product of the process.

References Cited

UNITED STATES PATENTS

| | | | |
|---|---|---|---|
| 2,298,791 | 10/1942 | Harrington | 208—311 |
| 2,302,916 | 11/1942 | Skinner | 252—362 |
| 2,976,224 | 3/1961 | Gilliland | 203—100 |
| 3,032,482 | 5/1962 | Shoemaker | 203—100 |
| 3,132,096 | 5/1964 | Walton | 23—312 |
| 3,155,610 | 11/1964 | Williams | 23—312 |
| 3,219,554 | 11/1965 | Woodward | 203—11 |
| 3,232,847 | 2/1966 | Hoff | 203—11 |
| 3,236,747 | 2/1966 | Margiloff | 203—100 |

OTHER REFERENCES

Progress Report No. 22, Research on Liquid-Liquid Extraction for Saline Water Conversion, U.S. Dept. of Interior, OSW, December 1958, pp. 1–10 relied upon.

NORMAN YUDKOFF, *Primary Examiner.*

WILBUR L. BASCOMB, JR., *Assistant Examiner.*